United States Patent [19]

Toda

[11] Patent Number: 5,110,066
[45] Date of Patent: May 5, 1992

[54] SPEED CHANGE APPARATUS FOR A FISHING REEL

[75] Inventor: Junichi Toda, Sakai, Japan

[73] Assignee: Shimano Inc., Osaka, Japan

[21] Appl. No.: 678,219

[22] Filed: Apr. 1, 1991

[30] Foreign Application Priority Data

Apr. 6, 1990 [JP] Japan .................... 2-92858

[51] Int. Cl.⁵ .................... A01K 89/015; F16H 3/08
[52] U.S. Cl. .................... 242/255; 74/411.5; 74/421 R
[58] Field of Search .................... 74/411.5, 414, 421 R; 242/249, 255

[56] References Cited

U.S. PATENT DOCUMENTS

| | | | |
|---|---|---|---|
| 703,614 | 7/1902 | Rock | 74/421 R |
| 2,615,352 | 10/1952 | Mies et al. | 242/255 X |
| 3,029,658 | 4/1962 | Dassance | 74/421 R |
| 3,499,609 | 3/1970 | Policansky | 242/255 X |
| 4,466,335 | 10/1980 | Kaneko | 242/255 |
| 4,867,392 | 9/1989 | Sato | 242/255 |
| 4,871,129 | 10/1989 | Hashimoto | 242/255 |
| 4,951,899 | 8/1990 | Moosberg | 242/255 |
| 4,951,989 | 8/1990 | Sakaguchi | 242/255 |
| 5,035,374 | 7/1991 | Kaneko | 242/249 X |
| 5,058,447 | 10/1991 | Ikuto | 242/255 X |

FOREIGN PATENT DOCUMENTS 1217153 3/1967 United Kingdom .................... 74/411.5

Primary Examiner—Leslie A. Braun
Assistant Examiner—Ryan W. Massey
Attorney, Agent, or Firm—Dickstein, Shapiro & Morin

[57] ABSTRACT

A speed change apparatus for a fishing reel is provided with an input shaft having a first sun gear, a second sun gear different therefrom in the number of teeth, and a differential gear having smaller diameter toothed portion and a larger diameter toothed portion different in the number of teeth from each other and engageable with the first and second sun gears, respectively. The differential gear is rotatably supported to a reel body. The smaller diameter toothed portion is separated from the larger diameter toothed portion so that one or both of the toothed portions is made freely rotatable. And a clutch for integrally connecting or disconnecting both the smaller diameter toothed portion and larger diameter toothed portion is provided. Thus, a first transmission system for transmitting a driving force from the input shaft to an output shaft and a second transmission system for disconnecting both the toothed portions for transmitting the driving force of the input shaft to the output shaft through direct connection are made selectable by manual operation.

8 Claims, 7 Drawing Sheets

5,110,066

SPEED CHANGE APPARATUS FOR A FISHING REEL

FIELD OF THE INVENTION

The present invention relates to a speed change apparatus for a fishing reel, and more particularly to a speed change apparatus for a fishing reel which is adapted to change the speed of driving a fishing line winding member, such as a rotor for supporting a spool or a bail arm.

In other words, the present invention relates to a speed change apparatus mounted on a reel body at the fishing reel and provided in a driving force transmitting system for transmitting the driving force from a handle at the fishing reel to a spool side driving member for driving the fishing line winding member, such as the spool or rotor.

BACKGROUND OF THE INVENTION

Conventionally, the fishing reel has typically widely used a double bearing type reel which drives a spool for winding the fishing line and a spinning type one which drives a bail arm for retaining the fishing line. Most of these fishing reels are provided between a hand-operated handle and the fishing line winding member, such as the spool or rotor, with a driving force transmitting system for transmitting the driving force caused by the handle to the fishing line transmitting member.

Most conventionally proposed fishing reels are so constructed that the fishing line winding member is usually driven at a predetermined speed change ratio, whereby the handle must be adjusted of its hand operation with respect to variation in a load of a fish, thereby creating the problem of requiring skills to that extent.

In order to solve this problem, fishing reels have been proposed which are manually changeable of the speed at two stages of high speed and low speed or automatically changeable at the same.

The reel of automatic 2-stage speed change type has hitherto been disposed as disclosed in, for example, Japanese Patent Publication No. Sho 49-26353 Gazette, which is so constructed that a drive shaft is rotatably supported to a handle shaft having the handle, the drive shaft is provided with a large face-gear engageable with a small face-gear at a tubular shaft in association with a roller and a first spur gear, a reduction tubular gear having a second spur gear is rotatably supported to the drive shaft, an intermediate shaft extending in parallel to the handle shaft is rotatably supported to a reel body, at the intermediate shaft is provided a third spur gear engageable with the second spur gear, a fourth spur gear engageable with the first spur gear is provided on a driven shaft rotatably supported to the intermediate shaft, a changeover lever is provided at the handle shaft, between the changeover lever and the drive shaft is provided a first ratchet means which, when a load on the fishing line is smaller than a predetermined load, engages by operation of the changeover lever and, when the load is larger than the predetermined load, disengaged by the same, and between the third gear and the fourth gear is provided a second ratchet means for transmitting rotation only in one direction, so that when a load acting on the fishing line is smaller, the handle shaft is directly connected with the drive shaft to rotate the roller at high speed and, when the load becomes larger than the predetermined load, the rotation speed is reduced to rotate the roller at low speed.

Such speed change apparatus is automatically changeable of the speed at two stages, but has the problem in that construction is complicated and manufacturing cost is high.

Also, the speed change apparatus, which can change-over the speed at high and low not by automatic operation but by manual operation, has been proposed. This apparatus uses a planetary gear mechanism so as to diminish a pitch diameter of each planetary gear, thereby reducing a speed ratio between the high and the low. However, the planetary gear is limited in reduction of its pitch diameter in view of strength, thereby creating the problem in that it is difficult to obtain a desired gear ratio without enlarging the apparatus as a whole and that the use of planetary gears makes its structure complicated and manufacturing cost high.

The inventor has hitherto proposed a manual speed change apparatus which uses a differential gear but not the planetary gear mechanism (Japanese Patent Application No. Hei 2-10983 filed on Jan. 20, 1990, filed but not yet laid-open), which is so constructed that the differential gear is supported on a disc-like gear holder so as to control or release rotation of the holder by a changeover mechanism to thereby directly connect the handle shaft (input shaft) and an output shaft, or a driving force is transmitted from the handle shaft to the output shaft through the differential gear.

In such construction, however, the differential gear is supported by use of the gear holder as the above-mentioned, whereby, when the speed change apparatus is housed in the reel body, it is required to provide a space for allowing the gear holder to rotate, thereby creating the problem in that the fishing reel becomes large-sized as a whole and larger in weight.

SUMMARY OF THE INVENTION

An object of the invention is to provide a speed change apparatus using a differential gear to be simple in construction and eliminating a gear holder to miniaturize the fishing reel as a whole.

The present invention is characterized in that a speed change apparatus provided in a driving force transmitting system mounted on a reel body and disposed from a handle of the fishing reel to a driving member, such as, a spool or a roller, is provided with;

a) an input shaft having a first sun gear having a predetermined number of teeth and rotatable by driving operation of the handle;

b) an output shaft at the spool side having a second sun gear having a different number of teeth from those at the first sun gear;

c) a differential gear comprising teeth at the smaller diameter side having a predetermined number of teeth engageable with one of the first sun gear and second sun gear and teeth at the larger diameter side having a larger number of teeth than that of the smaller diameter side engageable with the other, the differential gear being rotatably supported to the reel body, one of the smaller diameter side teeth and larger diameter side being freely rotatably supported with respect to the other, and, d) a transmission changeover mechanism provided with clutch means for connecting or cutting off the smaller diameter side teeth and larger diameter side teeth so as to select a first transmission system for connecting the smaller diameter side teeth and larger diameter side teeth to transmit the driving force from the input shaft to the output shaft through the differential gear and a second transmission system for disconnecting the smaller diameter toothed portion from the larger diameter toothed portion to directly connect the input shaft and output shaft. Namely, one of the smaller diameter toothed portion and larger diameter toothed portion at the differential gear is rotatably supported with respect to the other so that the toothed portions are connected to integrally rotate, or disconnected to be freely rotated, thereby enabling both the first and second transmission systems to be selected.

Accordingly, when the first transmission system is selected by the transmission changeover mechanism, the smaller diameter and larger diameter toothed portions are connected through the clutch means, whereby the rotation of the handle is transmitted from the input shaft to the output shaft through the sun gears and differential gear to enable the output shaft to be rotated in acceleration or deceleration. When the transmission changeover mechanism selects the second transmission system, the smaller and larger diameter toothed portions are disconnected from each other, thereby directly rotating the output shaft from the input shaft not through the differential gear.

Moreover, the use of the differential gear can simplify the construction of the apparatus without using the conventional automatic speed change apparatus having a plurality of spur gears or the manual speed change apparatus having the planetary gear mechanism. The differential gear is supported to the reel body instead of the gear holder as previously proposed and one of the smaller diameter and larger diameter toothed portions is made rotatable and they are connected to integrally rotate or disconnected from each other, the speed change apparatus is compact to diminish space of reel body, thereby miniaturizing the reel and reducing it in weight as a whole.

In the above-mentioned construction, it is preferable that the number of teeth of the first sun gear is made larger than that of the second sun gear, the smaller diameter toothed portion at the differential gear engages with the first sun gear and the larger diameter toothed portion at the same engage with the second sun gear so that when the transmission changeover mechanism selects the first transmission system, the rotation of the input shaft is accelerated by the differential gear to be transmitted to the output shaft. Therefore, the output shaft, when directly connected to the input shaft, rotates in acceleration, thereby driving the fishing line member at high-speed.

The speed change apparatus of the invention is further characterized in that one of the smaller diameter and larger diameter toothed portions is axially movable with respect to the other and between the smaller diameter toothed portion and the larger diameter toothed portion is provided clutch means which moves in one axial direction to connect the smaller diameter and larger diameter toothed portions and moves in the other axial direction to disconnect both the toothed portions.

Thus, it is possible to connect or disconnect them by the axial movement of one of them, thereby making simple the construction of clutch means and performing connection and disconnection by the axial movement of one of smaller diameter toothed portion and larger diameter toothed portion.

Furthermore, it is preferable that the transmission changeover mechanism is provided with a clutch operating member having an operating member and a control member for axially moving one of the smaller diameter and larger diameter toothed portions and with a one-direction-rotation transmitting mechanism which, when the clutch means disconnects the smaller diameter toothed portion from the larger diameter toothed portion, transmits the rotation of input shaft to the output shaft.

Thus, the first or second transmission system can be selected only by axially moving one of the toothed portions due to operation of clutch means so as to obtain good operability.

On the other hand, when the larger diameter toothed portion at a differential gear engages with a first sun gear and the smaller diameter toothed portion at the same engages with a second sun gear so that a transmission changeover mechanism selects the first transmission system, the rotation of the input shaft is decelerated and transmitted to the output shaft, whereby the output shaft can be rotated in deceleration in the case where the same is directly connected with the input shaft by selection of the second transmission system, and the fishing line winding member, such as the spool, can be driven in deceleration.

In the construction mentioned above it is preferable that the transmission changeover mechanism is provided with a direct connection mechanism for directly connecting the input shaft and output shaft and that the clutch means comprises a one-direction-rotation transmission mechanism, when the first transmission system is selected during the disconnection of the input shaft from the output shaft by the direct connection mechanism.

In this case, one of the first and second transmission systems can be selected by the transmission changeover mechanism through the direct connection of the input shaft and output shaft or disconnection thereof by the direct connection mechanism, so that the smaller diameter and larger diameter toothed portion can automatically be connected or disconnected.

The above and further objects and novel features of the invention will more fully appear from the following detailed description when the same is read in connection with the accompanying drawings.

DETAILED DESCRIPTION OF THE INVENTION

Figure 1:
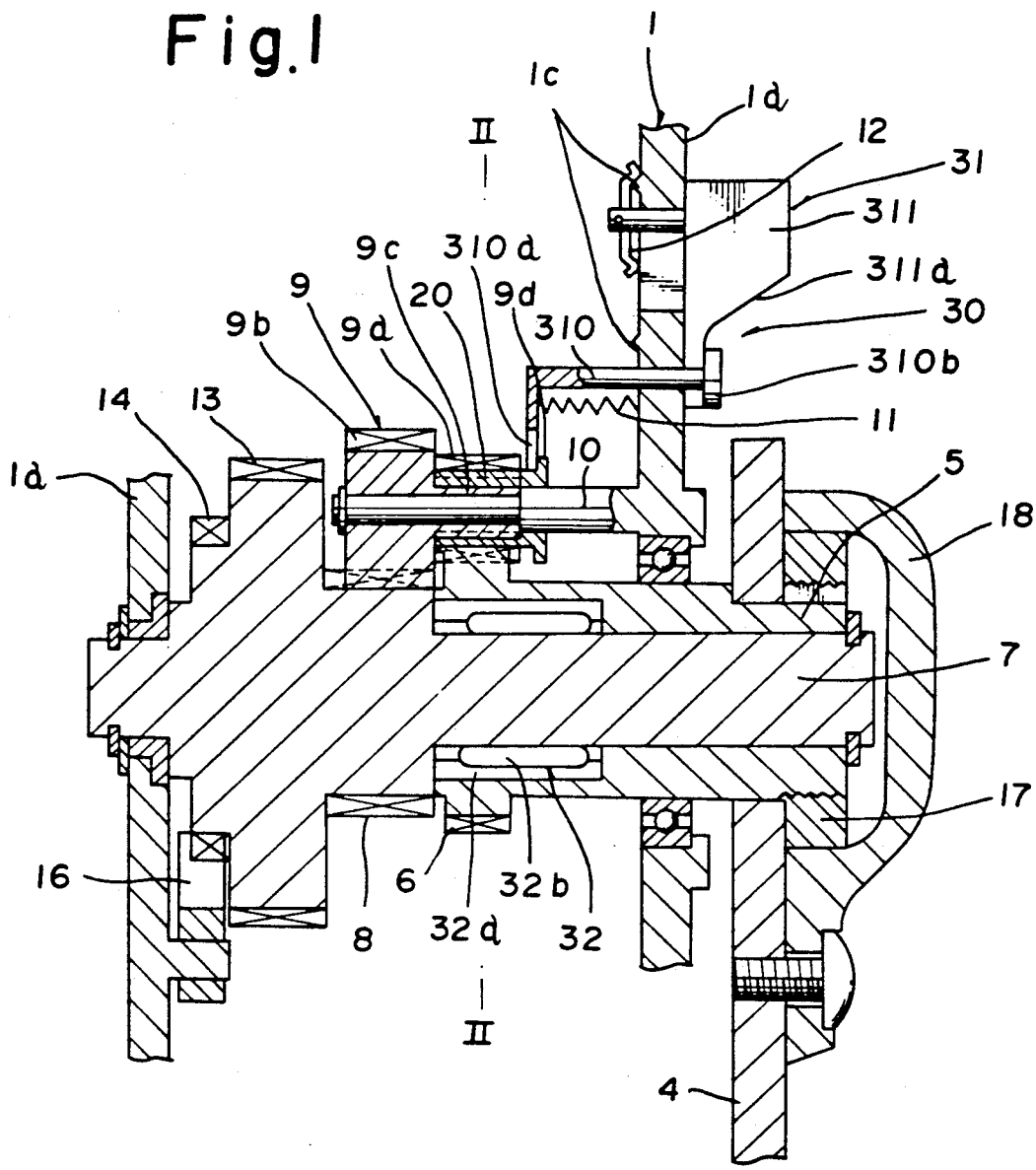
FIG. 1 is a sectional view of a first embodiment of a first embodiment of the present invention.
Figure 2:
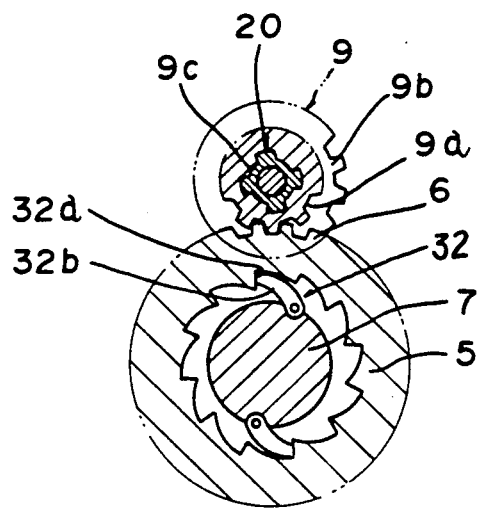
FIG. 2 is a sectional view taken on the line II—II in FIG. 1.
Figure 3:
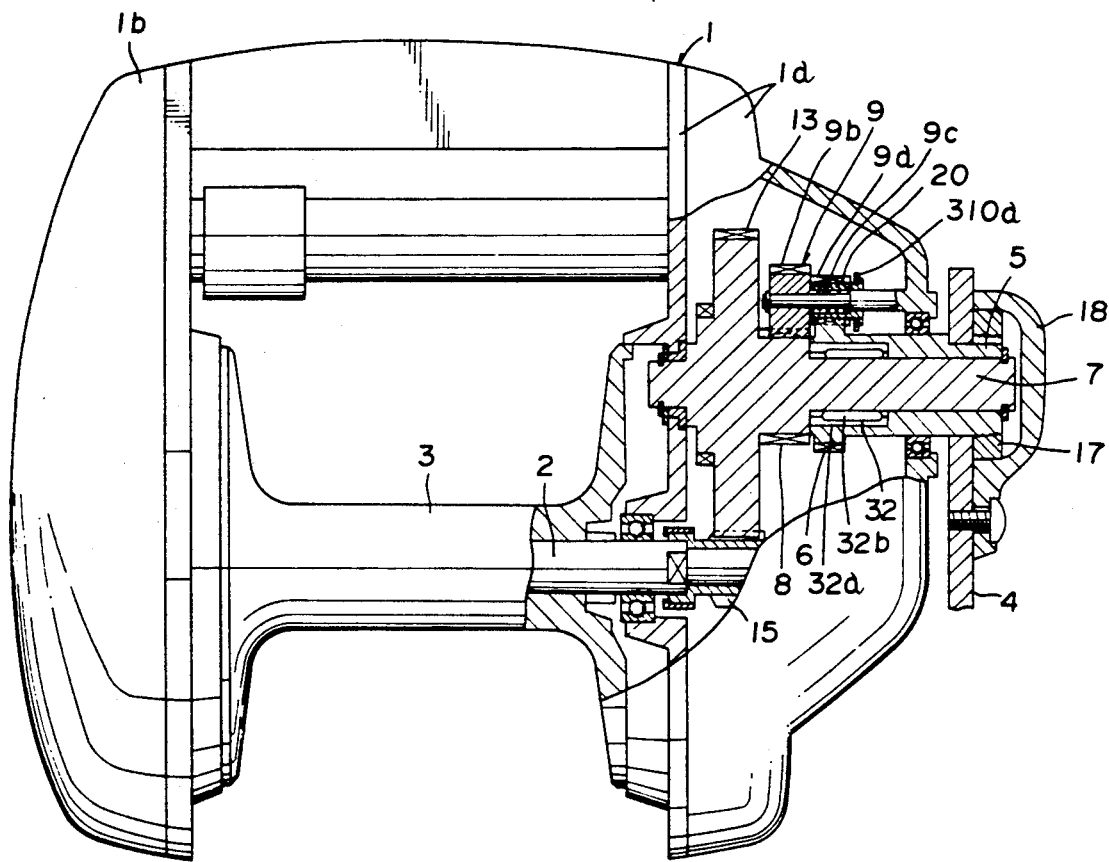
FIG. 3 is a partially sectional view of an entire fishing reel, showing an example applied with the first embodiment.

Embodiments shown in FIGS. 1 through 8 are adapted to change the speed by acceleration with respect to a second transmission system for directly connecting an input shaft and an output shaft. A first embodiment shown in FIGS. 1 through 3 will be described first. The first embodiment, as entirely shown in FIG. 3, is a fishing reel of double bearing type which rotatably supports through a spool shaft 2 a spool 3 to a reel body 1 provided with side frames 1a and 1b opposite to each other at a predetermined interval. A tubular input shaft 5 rotatable by operaton of a handle 4 is provided in parallel to the spool shaft 2 and a first sun gear 6 is integrally provided at the outer periphery of one end of the input shaft 5. At the inner periphery of input shaft 5 is rotatably fitted an output shaft 7 at the spool side supported at one end rotatably to the side frame 1a, and a second sun gear 8 less in number of teeth than the first sun gear 6 is integrally provided at the outer periphery of an intermediate portion of the output shaft 7. A pivot shaft 10 projects from the side frame 1a, to which a differential gear 9 having toothed portions 9a and 9b different in number of teeth from each other and engageable with the first and second sun gears 6 and 8 respectively is rotatably supported. The smaller diameter toothed portion 9a is separate from the larger diameter toothed portion 9b, and rotatably supported with respect to the larger diameter toothed portion 9b, and made axially movable. Clutch means 20 is formed which axially moves the smaller diameter toothed porton 9a to connect the smaller diameter toothed portion 9a and larger diameter toothed portion 9b to be integrally rotatable, or disconnect the toothed portions 9a and 9b. Furthermore, a transmission changeover mechanism 30 is provided which selects a first transmission system for connecting the smaller diameter toothed portion 9a and larger diameter toothed portion 9b so as to transmit a driving force from the input shaft 5 to the output shaft 7 through the differential gear 9 and a second transmission system for disconnecting the toothed portion 9a from the toothed portion 9b so as to directly connect the input shaft 5 and output shaft 7.

In other words, the differential gear 9 is divided into the smaller diameter toothed portion 9a having a fitting bore and the larger diameter toothed portion 9b having at one end a tubular shaft portion 9c, the larger diameter toothed portion 9b being rotatably supported to the pivot shaft 10 and provided at the outer periphery of the tubular shaft portion 9c with four external teeth axially extending as shown in FIG. 2, the smaller diameter toothed portion 9a being provided with a shaft bore to be fitted to the tubular shaft portion 9c, so that four internal teeth axially extending are provided at the inner periphery of the shaft bore and the smaller diameter toothed portion 9a is axially movably fitted onto the tubular shaft portion 9c, thereby forming the clutch means 20 with the internal teeth provided at the inner surface of smaller diameter toothed portion 9a and external teeth provided at the outer periphery of tubular shaft portion 9c. As shown in FIG. 1, at the side frame 1a is movably provided a clutch operating member 31 for axially moving the smaller diameter toothed portion 9a and between the input shaft 5 and the output shaft 7 is provided a one-direction-rotation transmitting mechanism 32, thereby constituting the transmission mechanism 30 with the clutch means 20, clutch operating member 31, and one-direction-rotation transmission mechanism 32. The clutch means 20 connects the smaller diameter toothed portion 9a and larger diameter toothed portion 9b so as to accelerate the rotation of input shaft 5 and transmit it to the output shaft 7. The clutch operating member 31 is operated to axially move the smaller diameter toothed portion 9a to disconnect the toothed portion 9a from the portion 9b, thereby enabling the output shaft 7 and input shaft 5 to be directly connected through the one-direction-rotation transmitting mechanism 32. The clutch operating member 31, as shown in FIG. 1, is provided with a rod-like operating member 310 having at one end a furcate engaging portion 310a and at the other end an engaging projection 310b and with a rod-like control member 311 having a cam 311a engageable with the engaging projection 310b, the operating member 310 being supported movably in the same direction as the smaller diameter toothed portion 9a so that the engaging portion 310a engages with a flange 9d provided axially outside of the smaller diameter toothed portion 9a. Also, the control member 311 is movably supported to the side frame 1a in relation of being movable perpendicularly to the moving direction of smaller diameter toothed portion 9a, and a spring 11 for biasing the operating member 310 toward the larger diameter toothed portion 9b is provided at the side frame 1a. Accordingly, the control member 311 is pushed to move the operating member 310 against the spring 11 so that the smaller diameter toothed portion 9a moves it with respect to the larger diameter toothed portion 9b to thereby disconnect them. The control member 311 is returned to axially move the operating member 310 by the spring 11, thereby connecting the smaller diameter toothed portion 9a with the larger diameter toothed portion 9b. In addition, to the control member 311 is mounted a leaf spring 12 having engaging portions engageable with two positioning projections 1c provided at the side frame 1a, thereby enabling the operating position of control member 311 to be maintained.

The one-direction-rotation transmitting mechanism 32, as shown in FIG. 2, comprises ratchet teeth 32a circumferentially provided at the inner periphery of input shaft 5 and transmitting pawls 32b and is provided between the input shaft 5 and the output shaft 7, the transmitting pawls 32b being held to the output shaft 7 in relation of desirably rising or falling, and biased to the ratchet teeth 32a by use of pawl springs (not shown). When the smaller diameter toothed portion 9a connects with the larger diameter toothed portion 9b, the output shaft 7 clockwise rotates in acceleration with respect to the input shaft, whereby the transmitting pawls 32b do not engage with the ratchet teeth 32a. When the smaller diameter toothed portion 9a disconnects from the larger diameter toothed portion 9b, the input shaft 5 clockwise rotates in FIG. 2 and the transmitting pawls 32b engage with the ratchet teeth 32a, whereby the output shaft 7 can be directly connected with the input shaft 5.

In addition, in FIGS. 1 through 3, reference numeral 13 designates a main gear integral with the output shaft 7, 14 designates an anti-reverse-rotation gear, 15 designates a pinion supported at the spool shaft 2 and engageable with the main gear 13, 16 designates an anti-reverse-rotation pawl engageable with or disengageable from the anti-reverse-rotation gear 14, 17 designates a mounting nut for mounting the handle 4 to the input shaft 5, and 18 designates a locking member for preventing the mounting nut from loosening. In FIGS. 1 and 3, the main gears are different in diameter, but this is optional.

Next, explanation will be given on operation of the speed change apparatus.

At first, when the spool 3 is intended to rotate at high speed, the transmission changeover mechanism 30 selects the first transmission system. The control member 311 at the clutch operating member 31 is operated to connect the smaller diameter toothed portion 9a to the larger diameter toothed portion 9b as shown in FIG. 1, so as to be integrally rotatable. In this state, when a handle 4 mounted on one end of input shaft 5 is rotated in the direction of winding a fishing line, the input shaft 5 rotates together with the handle 4 so that the differential gear 9, whose smaller diameter toothed portion 9a is integral with the larger diameter toothed portion 9a, rotates through the first sun gear 6 so as to rotate the second sun gear 8 engaging with the larger diameter toothed portion 9b and the output shaft 7, whereby the angular velocity of the output shaft 7 is greater than that of the input shaft 5 to an extent which corresponds to the difference in teeth number between both the toothed portions 9a and 9b. In this case, the one-direction-rotation transmitting mechanism 32 provided at the second transmission system for directly connecting the input shaft 5 and output shaft 7, is put in the not-operating state. The driving force transmitted to the output shaft 7 is transmitted to the spool 3 through the main gear 13, pinion 15, and spool shaft 2, thereby rotating the spool 3 at high speed.

Next, when the spool 3 is rotated at low speed, the transmission changeover mechanism 30 selects the second transmission system. In other words, in the state in FIG. 1, the control member 311 is pushed to move the smaller diameter toothed portion 9a axially, that is, rightwardly in FIG. 1, so that the internal teeth of the smaller diameter toothed portion 9a is disengaged from the external teeth of tubular shaft portion 9c, thereby disconnecting the smaller diameter toothed portion 9a from the larger diameter toothed portion 9b. In this state, when the handle 4 is rotated in the direction of winding the fishing line, the larger diameter toothed portion 9b freely rotates with respect to the smaller diameter toothed portion 9a, whereby the differential gear 9 transmits no driving force to the output shaft 7. As a result, the input shaft 5 rotating together with the handle 4 is directly connected to the output shaft 7 through the one-direction-rotation transmitting mechanism 32 so that the output shaft 7 is not accelerated but rotates at equal speed to the input shaft 5. The driving force is transmitted from the output shaft 7 to the spool 3 through the main gear 13, pinion 15, and spool shaft 2, thereby rotating the spool 3 at low speed.

Figure 4:
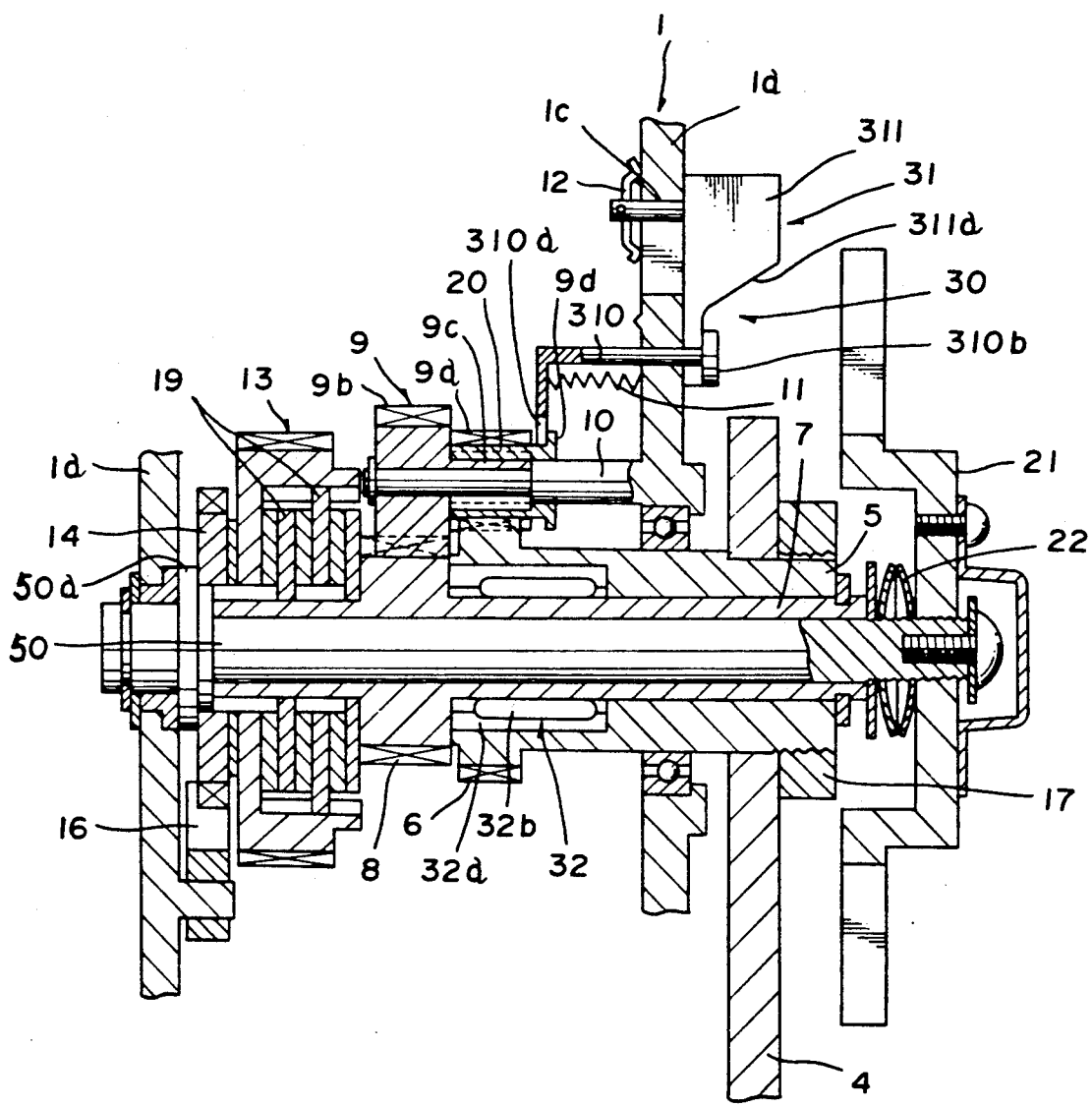
FIG. 4 is a sectional view of a second embodiment of the present invention.

Next, explanation will be given on a second embodiment shown in FIG. 4, in which the main gear 13 fixed to the output shaft 7 in the first embodiment is formed separate from the output shaft 7 so as to be rotatably supported thereto and between the main gear 13 and the output shaft 7 is provided a drag mechanism provided with a drag braking plate 19 for applying a braking force against the rotation of main gear 13. In addition, in the second embodiment, the output shaft 7 is made tubular, and into the inner periphery thereof is inserted a fixed shaft 50 having a flange 50a opposite to the side surface of anti-reverse rotation gear 14, one end of the fixed shaft 50 is mounted to the side frame 1a, and a drag adjuster 21 is screwed with the other end of the fixed shaft 20, so that the adjuster 21 is rotated to axially move the output shaft 7 so as to urge the drag braking plate 19 and apply the predetermined resistance to the rotation of main gear 13. In the second embodiment, construction and operation other than the above-mentioned are the same as those in the first embodiment omitted. In addition in, FIG. 4, reference numeral 22 designates a leaf spring.

Figure 5:
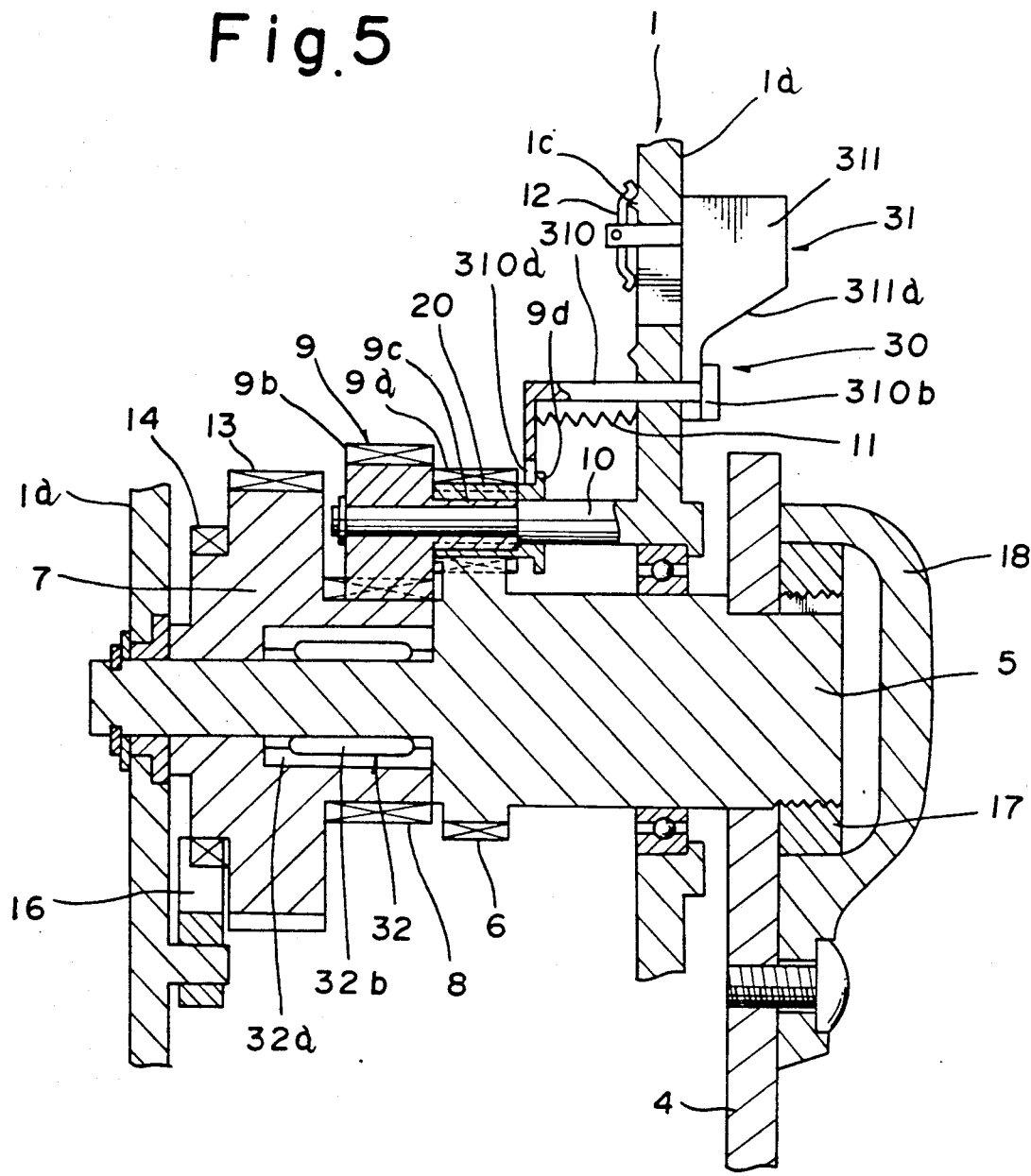
FIG. 5 is a sectional view of a third embodiment of the present invention.
Figure 6:
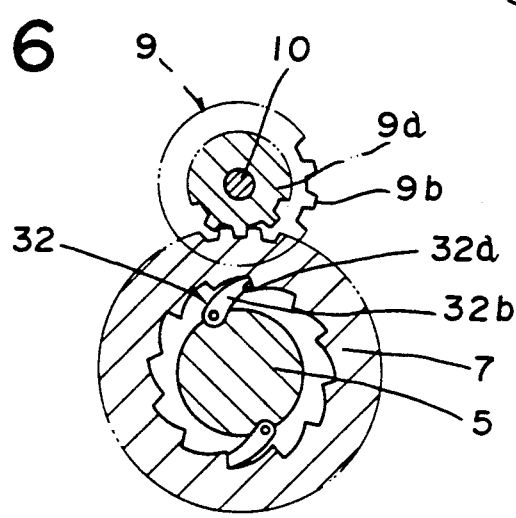
FIG. 6 is a sectional view of the third embodiment, corresponding to FIG. 2.

Next, explanation will be given on a third embodiment of the invention shown in FIGS. 5 and 6, in which the input shaft 5 is solid and stepped, and the output shaft 7 is tubular and rotatably supported at the outer periphery of one axial end of input shaft 5, and the one-direction-rotation transmitting mechanism 32 is provided between the inner periphery of output shaft 7 and the outer periphery of input shaft 5, in other words, at the output side of differential gear 9. In this case, ratchet teeth 32a and transmitting pawls 32b at the one-direction-rotation transmitting mechanism 32 face reversely to those in FIG. 2. In detail, when the clutch means 20 integrally connects the smaller diameter toothed portion 9a with the larger diameter toothed portion 9b (the first transmission system is selected) and the handle 4 is rotated in the direction of winding the line, the output shaft 7 is accelerated in rotation clockwise in FIG. 6 with respect to the input shaft 5 at the center side so that when transmitting pawls 32b are supported at the input shaft 5 at the center side and the ratchet teeth 32a are circumferentially provided at the outside output shaft 7, the ratchet teeth 32a and transmitting pawls 32b are adapted to face reversely as the above-mentioned. In addition, in the third embodiment, construction and operation other than the above are also the same as those in the first embodiment, detailed description thereof is omitted herein.

Furthermore, a fourth embodiment shown in FIG. 7 will be described, which is so constructed that a tubular input shaft 5 is rotatably supported to the side frame 1a, a handle shaft 23 is relative-movably and not-relative-rotatably fitted into the tubular input shaft 5, the drag adjuster 21 is screwed with the one end of handle shaft 23, between the adjuster 21 and the end face of input shaft 5 is interposed the leaf spring 22, the output shaft 7 comprises a first shaft 7a having the sun gear 8 and an external flange 7c and a second shaft 7b holding the drag braking plate 19 and integrally forming an anti-reverse-rotation gear 14, the first shaft 7a is fitted onto the outer periphery of second shaft 7b in relation of being relative-movable and not-relative-rotatable, the second shaft 7b is rotatably and movably supported to the handle shaft 23, the onedirection-rotation transmitting mechanism 32 is provided between the second shaft 7a and the handle 4 so that the handle shaft 23 is directly connected with the second shaft 7b, that is, the second shaft 7b is directly connected to the input shaft 5, a thrust bearing 24 is provided between the end surface of input shaft 5 and the stepped portion at the inner periphery of first shaft 7a, and a thrust bearing 26 is provided between the end surface of second shaft 7b and a bearing cylinder 25 supported at the side frame 1a. In addition, construction other than the above-mentioned is the same as that in the first embodiment, whereby detailed description thereof is omitted.

In this embodiment, when clutch means 20 integrally connects a smaller diameter toothed portion 9a with a larger diameter toothed portion 9b, in other words, when the first transmission system is selected to rotate a handle 4 in the direction of winding the fishing line, the input shaft 5 rotates through the handle shaft 23, a differential gear 9 of the smaller diameter toothed portion 9a integral with the larger diameter toothed portion 9b rotates through a first sun gear 6 at the input shaft 5, so that a second sun gear 8 engageable with the larger diameter toothed portion 9b and the first shaft 7a rotate, the first shaft 7a rotating in acceleration with respect to the rotation of input shaft 5 to an extent of a difference in teeth number between the smaller diameter toothed portion 9a and the larger diameter toothed portion 9b. In this case, the second shaft 7b, which not-relative-rotatably supports the first shaft 7a, also rotates in acceleration, the one-direction-rotation transmitting mechanism 32 interposed between the second shaft 7b and the handle shaft 23 being in not-operating condition due to the acceleration of second shaft 7b. Since the thrust bearing 24 is provided between the input shaft 5 and the first shaft 7a, the output shaft 7 can be smoothly rotated. When the clutch means 20 disconnects the smaller diameter toothed portion 9a from the larger diameter toothed portion 9b so as to make the smaller diameter toothed portion 9a freely rotatable with respect to the larger diameter toothed portion 9b and the handle 4 rotates in the direction of winding the line, the input shaft 5 is directly connected to the second shaft 7b of output shaft 7, whereby the output shaft 7 rotates without being accelerated. Also, the drag adjuster 21 is rotated to urge the drag braking plate 19 with respect to the handle shaft 23 through the input shaft 5, thrust bearing 24, first shaft 7a and flange 7c, thereby enabling the rotation of main gear 13 to be given resistance.

Incidentally, in the above-mentioned embodiment, the internal teeth and external teeth form the clutch means 20, but clutch means may alternatively be separate from the smaller diameter toothed portion 9a and be axially movable, thus not limiting the clutch 20 in the construction of the embodiment. Embodiments shown in FIGS. 8 through 11 are adapted to change the speed by deceleration with respect to direct connection.

Figure 8:
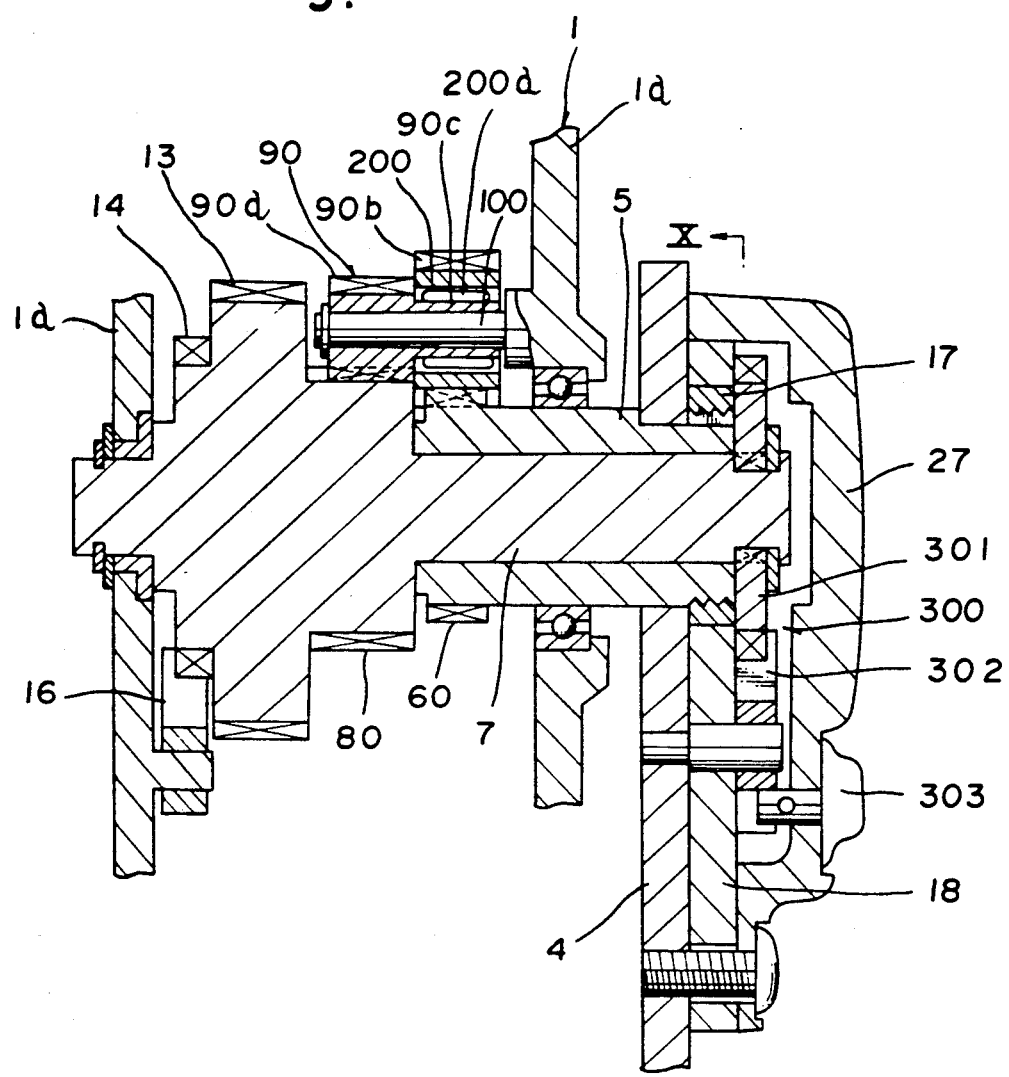
FIG. 8 is a sectional view of a fifth embodiment of the present invention.
Figure 9:
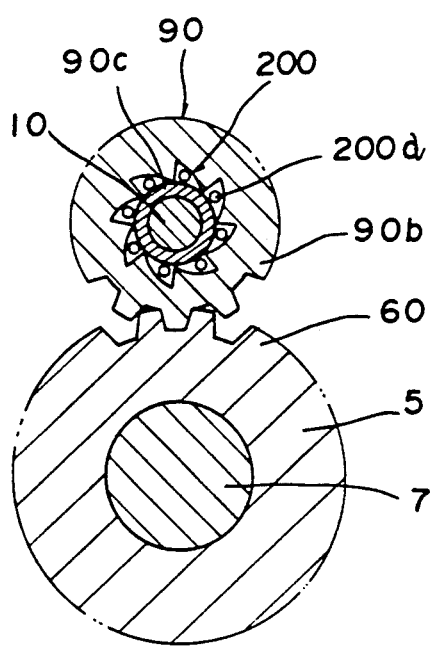
FIG. 9 is a sectional view of the fifth embodiment, corresponding to FIG. 2.
Figure 10:
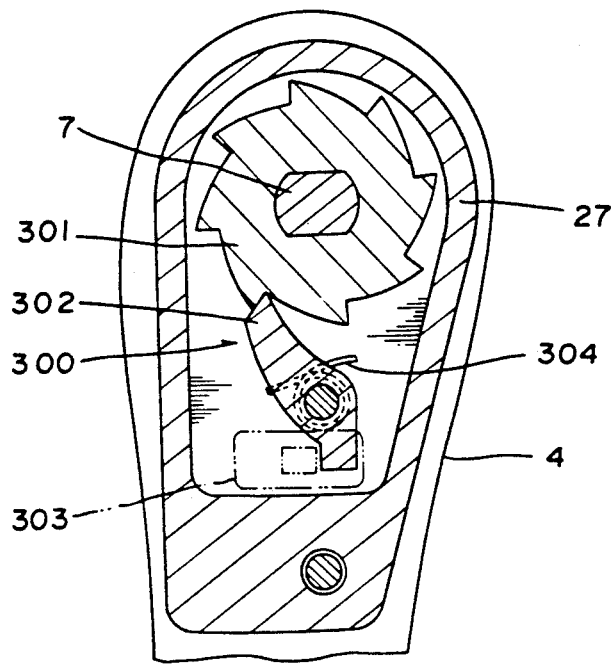
FIG. 10 is a sectional view taken on the line X—X in FIG. 8.

A fifth embodiment shown in FIGS. 8 through 10, like the first embodiment, is so constructed that the input shaft 5 rotatable by operation of handle 4 is rotatably supported to the side frame 1a, a sun gear 60 is integrally provided at the outer periphery of one axial end of input shaft 5, the output shaft 7 is rotatably fitted into the inner periphery of input shaft 5, and a second sun gear 80 is integrally provided at the outer periphery of an intermediate portion of output shaft 7, but is different in that the number of teeth at the first sun gear 60 is less than that of second sun gear 80, a larger diameter toothed portion 90b constituting a differential gear 90 engages with the first sun gear 60, and a smaller diameter toothed portion 90a engages with the second sun gear 80, so that, when the first transmission system is selected by a transmission changeover mechanism 300 (to be discussed below), the angular velocity of the output shaft 7 less than that of the input shaft 5.

In other words, the differential gear 90 of the fifth embodiment is formed of the smaller diameter toothed portion 90a having at one end a tubular shaft 90c and the larger diameter toothed portion 90b having the fitting inner surface, and the smaller diameter toothed portion 90a is rotatably supported to a pivot shaft 100 projecting from a side frame 1a, so that the larger diameter toothed portion 90b is rotatably fitted onto the outer periphery of tubular shaft 90c. Hence, there is no construction that one of the toothed portions 90a and 90b is axially moved toward the other.

The transmission changeover mechanism 300 in the fifth embodiment, as shown in FIG. 9, has at the inner periphery thereof recessed cam faces circumferentially formed and supports at the outer periphery of tubular shaft portion 90c a plurality of rolling members 200a so that a one-direction transmission mechanism comprising the cam faces and rolling members forms clutch means 200, and a direct connecting mechanism for directly connecting the input shaft 5 and output shaft 7 is provided.

The direct connecting mechanism, as shown in FIGS. 8 and 10, is constituted of a ratchet gear 301 mounted not-rotatably to one end of output shaft 7, a transmitting pawl 302 engageable with a ratchet gear 301, and a control member 303, the transmitting pawl 302 being pivoted to the handle 4 and biased by a pawl spring 304 toward the ratchet gear 301, the control member 303 being movably supported to a cover member 27 mounted to the handle 4, and operating to put the output shaft 7 in association with the handle 4, whereby the output shaft 7 is directly connected to the input shaft 5 in the direction of winding the line or disconnected from the input shaft 5. Accordingly, the directly connecting mechanism directly connects the output shaft 7 with the input shaft 5 and the output shaft 7 rotates integrally with the input shaft 5, whereby the smaller diameter toothed portion 90a engageable with the first sun gear 80 larger in tooth number rotates at higher speed than the larger diameter toothed portion 90b engageable with the second sun gear 60, and the smaller diameter toothed portion 90a is disconnected from the larger diameter toothed portion 90b by operation of clutch means 200, whereby the larger diameter toothed portion 90b freely rotates with respect to the smaller diameter toothed portion 90a. As the result, the output shaft 7 directly connects with the input shaft 5 and is driven at equal speed thereto.

Also, the fifth embodiment shown in FIGS. 8 through 10, as the same as the first embodiment, is integrally provided at the outer periphery of one axial end of output shaft 7 with the main gear 13 and anti-reverse-rotation gear 14.

When the spool 3 in the fifth embodiment is driven at low speed, the transmission changeover mechanism 300 selects the first transmission system. In other words, the control member 303 is operated to disengage the transmitting pawl 302 from the ratchet gear 301 to put the output shaft 7 in the rotatable state with respect to the input shaft 5, so that the handle 4 mounted on the end of input shaft 5 is rotated in the direction of winding the line. Then the input shaft 5 rotates together with the handle 4, the larger diameter toothed portion 90b engageable with the first sun gear 60 at the input shaft 5 rotates counterclockwise in FIG. 9, the larger diameter toothed portion 90b is connected with the smaller diameter toothed portion 90a by operation of the clutch means and rotates together with the smaller diameter toothed portion 90a, and the second sun gear 80 engageable with the smaller diameter toothed portion 90a and the output shaft 7 rotate, whereby the output shaft 7 rotates in deceleration to an extent of a difference in the number of teeth between the smaller diameter toothed portion 9a and the larger diameter toothed portion 9b. Accordingly, the output shaft 7 can be decelerated and the spool 3 can be driven at low speed.

The spool 3, in turn, the input shaft 5 is directly connected with the output shaft 7 so as to drive them at equal speed changing from low speed to high speed, the transmission changeover mechanism 300 selects the second transmission system. In other words, the control member 303 operates to engage the transmitting pawl 302 with the ratchet gear 301 to thereby directly connect the rotation of handle 4 with the output shaft 7 and then, the output shaft 7 rotates without deceleration. In this case, the rotation of handle 4 is directly transmitted to the input shaft 5 and simultaneously to the output shaft 7 through the transmitting pawl 302 and ratchet gear 301, at which time the smaller diameter toothed portion 9a engages with the second sun gear 80 larger in tooth number so as to rotate clockwise in (FIG. 9) at a higher speed than that of larger diameter toothed portion 9b engageabe with the first sun gear 60 smaller in tooth number, whereby the smaller diameter toothed portion 90a disengages from the larger diameter toothed portion 90b by operation of clutch means 20 so that the larger diameter toothed portion 90b freely rotates with respect to the smaller diameter toothed portion 90a.

Figure 7:
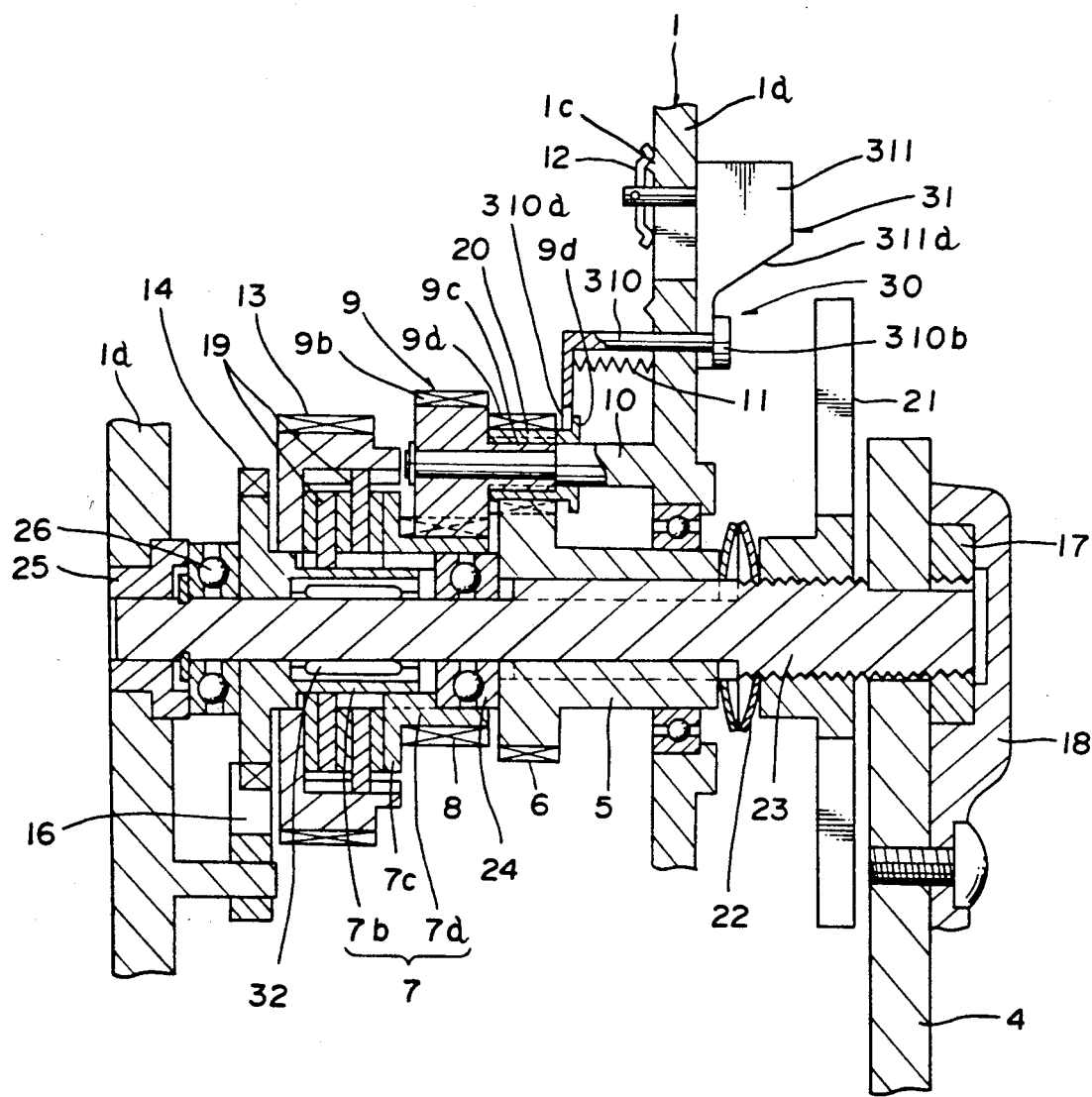
FIG. 7 is a sectional view of a fourth embodiment of the present invention.
Figure 11:
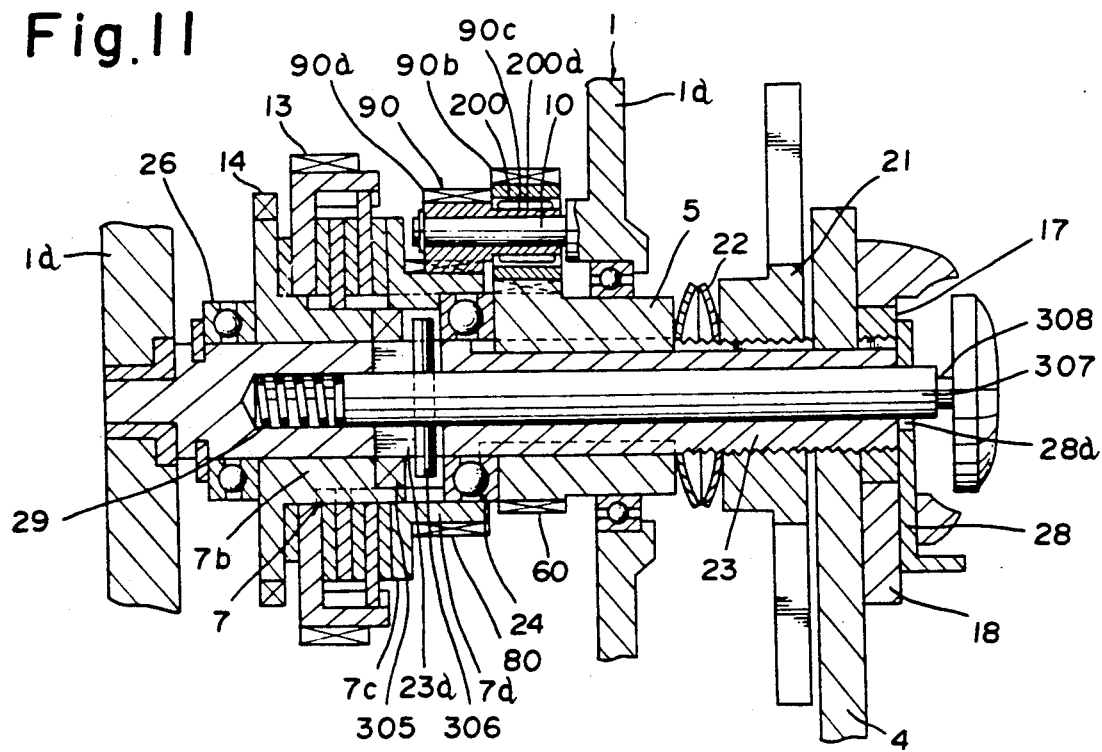
FIG. 11 is a sectional view of a sixth embodiment of the present invention.

A sixth embodiment shown in FIG. 11 changes the acceleration system described in FIG. 7, to a deceleration system, in which a handle shaft 23 is relative-movably and not-relative-rotatably fitted into a tubular input shaft 5 rotatably supported at the side frame 1a, the drag adjuster 21 is screwed with one end of handle shaft 23, a leaf spring 22 is interposed between the adjuster 21 and the end face of input shaft 5, the output shaft 7 is formed of a first shaft 7a having the second sun gear 80 and an external flange 7c and a second shaft 7b holding the drag braking plate 19 and being integrally formed of the anti-reverse-rotation gear 14, the first shaft 7a is relative-movably and not-relative-rotatably fitted onto the outer periphery of second shaft 7b, the second shaft 7b is rotatably and movably supported to the handle shaft 23, a transmission changeover mechanism 300 comprises engaging recesses 305 provided at one axial end of second shaft 7b and an operating rod 307 having engaging projections 306 of a pin engageable with the engaging recesses 305 and movably insertable into the central portion of handle shaft 23, a thrust bearing 24 is provided between the end face of the input shaft 5 and the stepped portion on the inner periphery of first shaft 7a, and a thrust bearing 26 is provided between the end face of the second shaft 7b and a bearing cylinder 25 supported to the side frame 1a. The handle shaft 23 is hollow at most thereof and provided at an intermediate portion with an elongate bore 23a therethrough, into which the engaging projection pin 306 is movably inserted, a lever 28 is movably held to a locking member 18 mounted to the handle 4, an elongate slot 28a, through which the operating rod 307 perforates, is provided at the lever 28a, so that a one-side end of elongate bore 28a engages with a retaining portion 308 provided at the operating rod 307 to thereby maintain the position of the operated control rod 307. In FIG. 11, reference numeral 29 designates a return spring for the operating rod 307. Also, construction other than the above is the same as those in FIGS. 8 through 10, thereby being omitted.

In the sixth embodiment, the transmission changeover mechanism 300 selects the first transmission system, in other words, the engaging projection 306 disengages from the engaging recess 305 as shown in FIG. 11, and the output shaft 7 is made rotatable with respect to the input shaft 5, so that when the handle 4 is rotated in the direction of winding the line, the input shaft 5 rotates through the handle shaft 23, a larger diameter toothed portion 90b engageable with the first sun gear 60 at the input shaft 5 is connected by the clutch means 200 with the smaller diameter toothed portion 90a engageable with the second sun gear 80, and a differential gear 90 (which is integral with the larger diameter toothed portion 90b and smaller diameter toothed portion 90a) rotates so that the second sun gear 80 engageable therewith and the first shaft 7a rotate, the first shaft 7a rotating in deceleration with respect to the input shaft 5 to an extent of a difference in tooth number between the larger diameter toothed portion 90b and the smaller diameter toothed portion 90a. Accordingly, the output shaft 7 can be rotated in deceleration for the direct connection, thereby enabling the spool 3 to be rotated at low speed. Also, in this embodiment, a thrust shaft 24 is provided between the input shaft 5 and the second shaft 7b, whereby the output shaft 7 can be smoothly rotated.

The transmission changeover mechanism 300 selects the second transmission system, in other words, the operating rod 307 is moved to engage the engaging projections 306 with the engaging recess 305, so that the rotation of handle 4 can be directly transmitted to the second shaft 7b at the output shaft 7 through the handle shaft 23 and engaging projections 306, thereby enabling the output shaft 7 to be rotated at equal speed to the input shaft 5 without being decelerated. In this case, the rotation of handle 4 is directly transmitted to the second shaft 7b and simultaneously to the output shaft 7 through the input shaft 5 and engaging projections 306, but the smaller diameter toothed portion 90a engages with the second sun gear 80 so as to rotate clockwise in FIG. 9 at higher speed than the larger diameter toothed portion 90b engaging with the first sun gear 60 smaller in tooth number, whereby the smaller diameter toothed portion 90a disconnects from the larger diameter toothed portion 90b due to operation of clutch means 200 to allow the larger diameter toothed portion 90b to freely rotate with respect to the smaller diameter toothed portion 90a. The drag adjuster 21 is rotated to urge the drag braking plate 19 with respect to the handle shaft 23 through the input shaft 5, thrust bearing 24, and first shaft 7a, thereby enabling the main gear 13 to be given resistance against its rotation.

In addition, the clutch means 200 comprising the one-direction-transmission mechanism in the aforesaid embodiment may alternatively be constructed the same as the acceleration system although a clutch operating member is required. Or, a separate clutch member may be used.

In a case where the direct connection mechanism is used, the differential gear may be plural.

The speed change apparatus of the present invention other than its use for the double bearing fishing reel constructed as the above-mentioned, may be applied to a spinning reel which drives a rotor to wind the line onto the spool.

As seen from the above, the speed change apparatus of the present invention is provided with the input shaft 5 having the first sun gear 6 or 60 and rotatable by operation of handle and the output shaft 7 at the spool side having the second sun gear 8 or 80 different from the first sun gear 6 or 60 in the number of teeth, rotatably supports to the reel body the differential gear 9 or 90 having the toothed portions 9a or 9b and 90a or 90b different in the number of teeth and engageable with the first and second sun gears 6 or 60 and 8 or 80, makes one of the smaller diameter toothed portion 9a or 90a and larger diameter toothed portion 9b or 90b freely rotatable with respect to the other, provides the clutch means 20 or 200 for connecting or disconnecting both the toothed portions 9a or 90a and 9b or 90b, and provides the transmission changeover mechanism 30 or 300 which selects the first transmission system for connecting the smaller diameter toothed portion 9a or 90a and larger diameter toothed portion 9b or 90b so as to transmit the driving force from the input shaft 5 to the output shaft 7 through the differential gear 9 or 90 and the second transmission system for disconnecting the smaller diameter toothed portion 9a or 90a and larger diameter toothed portion 9b or 90b so as to directly connect the input shaft 5 and output shaft 7, whereby the speed can be changed by simply operating the transmission changeover mechanism 30 or 300. Furthermore, the differential gear 9 or 90 is utilized. whereby the apparatus of the invention is not as complicated in construction as the conventional automatic speed change apparatus or the manual speed change apparatus using the planetary gear mechanism, rotatably supports the differential gear 9 or 90 to the reel body 1 without using the gear holder rotatable with respect to the reel body 1 as the previously proposed, the smaller diameter toothed portion 9a or 90a is separated from the larger diameter toothed portion 9b or 90b so that one of them is made rotatable with respect to the other, and the clutch means 20 or 200 for connecting or disconnecting both the toothed portions, whereby space in the reel body 1 can be diminished, the reel is miniaturized and reduced in weight, and inexpensive to produce.

Also, the smaller diameter toothed portion 9a engages with the first sun gear 6 and the larger diameter toothed portion 9b with the second sun gear 8, so that, when the transmission changeover mechanism 30 selects the first transmission system, the rotation of input shaft 5 is accelerated by the differential gear 9 to be transmitted to the output shaft 7, thereby enabling the line winding member, such as the spool, to be rotated at high speed.

One of smaller diameter toothed portion 9a and larger diameter toothed portion 9b is made axially movable to form the clutch means for connecting or disconnecting the toothed portions, thereby simplifying construction and operation of the clutch means.

The transmission changeover mechanism 30 is provided with the clutch operating member 31 and the one-direction-rotation transmitting mechanism 32 for transmitting the rotation of input shaft 5 to the output shaft 7, whereby the clutch lever 31 is simply operated to disconnect the clutch means 20, thereby enabling the connection and acceleration to be changed over.

Also, the larger diameter toothed portion 90b of the differential gear 90 engages with the first sun gear 60 and the smaller diameter toothed portion 90b with the second sun gear 80 so that when the transmission changeover mechanism 300 selects the first transmission system, the rotation of input shaft 5 is decelerated to be transmitted by the differential gear 90, thereby enabling the line winding member, such as the spool, to be driven in deceleration with respect to the disconnection.

In this deceleration drive system, the clutch means is constituted of one-direction-rotation transmitting mechanism, so that when the transmission changeover mechanism 300 selects the first transmission system, the rotation of larger diameter toothed portion 90b can always be transmitted to the smaller diameter toothed portion 90a, whereby such operation may not particularly be performed.

Although several embodiments have been described, they are merely exemplary of the invention and not to be construed as limiting, the invention being defined solely by the appended claims.

What is claimed is:

1. A fishing reel comprising:
a reel body, a fishing line winding member supported to said reel body to be rotatable with respect thereto, and a drive mechanism for driving said fishing line winding member, said drive mechanism comprising a rotatable handle and a speed change apparatus for changing a speed of said fishing line winding member driven by said drive mechanism upon rotation of said handle, said speed change apparatus comprising:
  (a) an input shaft supported to said reel body and adapted to be rotated by rotation of said handle;
  (b) an output shaft rotatably supported to said reel body, adapted to be rotated by rotation of said handle and coupled with said fishing line winding member;
  (c) a first sun gear provided on said input shaft and having a predetermined number of teeth;
  (d) a second sun gear provided on said output shaft and having a different number of teeth from that of said first sun gear;
  (e) a differential gear comprising a smaller diameter toothed portion having a predetermined number of teeth and engageable with one of said first and second sun gears and a larger diameter toothed portion having a larger number of teeth than that of said smaller diameter toothed portion, said differential gear being rotatably supported to said reel body, one of said smaller diameter toothed portion and larger diameter toothed portion being freely supported with respect to the other; and
  (f) a transmission changeover mechanism including clutch means for connecting or disconnecting said smaller diameter toothed portion and larger diameter toothed portion and for choosing between a first transmission system in which said smaller diameter toothed portion and larger diameter toothed portion are connected to transmit said driving force from said input shaft to said output shaft and a second transmission system in which said smaller diameter toothed portion and said larger diameter toothed portion are disconnected to connect said input shaft and output shaft directly.

2. A fishing reel according to claim 1, wherein said first sun gear has a larger number of teeth than said second sun gear, said smaller diameter toothed portion engaging with said first sun gear, said larger diameter toothed portion engaging with said second sun gear, so that when said transmission changeover mechanism selects the first transmission system, the angular velocity of said input shaft is accelerated and transmitted to said output shaft.

3. A fishing reel according to claim 2, wherein one of said smaller diameter toothed portion and larger diameter toothed portion is axially movable with respect to the other, and wherein said clutch means moves in a first axial direction to connect said smaller diameter toothed portion and larger diameter toothed portion and moves in a second axial direction to disconnect said smaller diameter toothed portion from said larger diameter toothed portion.

4. A fishing reel according to claim 3, wherein said larger diameter toothed portion is provided with a tubular shaft, said smaller diameter toothed portion has a shaft bore to be fitted to said tubular shaft, axially extending external teeth are provided on the outer periphery of said tubular shaft, axially extending internal teeth are provided at the inner periphery of said shaft bore, said internal teeth are engageable with said external teeth, said smaller diameter toothed portion is movable with respect to said larger diameter toothed portion, said clutch means operating (1) by moving said smaller diameter toothed portion in said first axial direction to engage said internal and external teeth and thereby connect said smaller diameter toothed portion and larger diameter toothed portion, and (2) by moving said smaller diameter toothed portion in the second axial direction to disengage said internal and external teeth and thereby disconnect said smaller diameter toothed portion from said larger diameter toothed portion.

5. A fishing reel according to claim 3, wherein said transmission changeover mechanism is further provided with (1) a clutch operating member having an operating member and a control member for axially moving one of said smaller diameter toothed portion and larger diameter toothed portion, and (2) a one-direction-rotation transmitting mechanism which, when said clutch means disconnects said smaller diameter toothed portion from said larger diameter toothed portion, transmits the rotation of said input shaft to said output shaft.

6. A fishing reel according to claim 1, wherein said first sun gear has fewer teeth than said second sun gear, said larger diameter toothed portion engages with said first sun gear and said smaller diameter toothed portion engages with said second sun gear, so that, when said transmission changeover mechanism selects the first transmission system, the angular velocity of said input shaft is decelerated and transmitted to said output shaft.

7. A fishing reel according to claim 6, wherein said transmission changeover mechanism is provided with a direct connection operating mechanism for directly connecting said input shaft and output shaft, said clutch means comprising a one-direction-rotation transmitting mechanism, which transmits rotation when said first transmission system is operated.

8. A fishing reel according to claim 7, wherein said smaller diameter toothed portion is provided with a tubular shaft portion, said larger diameter toothed portion has a shaft bore to be fitted to said tubular shaft portion and is rotatably supported with respect to said tubular shaft portion, and said one-direction-rotation transmitting mechanism is provided between said tubular shaft portion and said shaft bore.

* * * * *